United States Patent [19]
Melcher

[11] 3,829,266
[45] Aug. 13, 1974

[54] INJECTION MOLDING MACHINE

[75] Inventor: Robert Melcher, Gerlingen, Germany

[73] Assignee: Siemag Siegener Maschinenbau G.m.b.H., Hilchenback-Dahlbruch, Germany

[22] Filed: Jan. 31, 1973

[21] Appl. No.: 328,465

[30] Foreign Application Priority Data
Feb. 10, 1972 Germany.............................. 2206305

[52] U.S. Cl................................. 425/192, 425/450
[51] Int. Cl............................................. B29f 1/00
[58] Field of Search.................... 425/450, 242, 192

[56] References Cited
UNITED STATES PATENTS

| | | | |
|---|---|---|---|
| 2,358,686 | 9/1944 | Caron | 425/450 |
| 3,345,691 | 10/1967 | Aoki | 425/450 |
| 3,669,593 | 6/1972 | Cyriax | 425/450 |
| 3,687,590 | 8/1972 | Cyriax | 425/450 |
| 3,756,757 | 9/1973 | Grundmann | 425/450 |

Primary Examiner—Richard J. Herbst
Attorney, Agent, or Firm—Norman S. Blodgett; Gerry A. Blodgett

[57] ABSTRACT

An injection molding machine in which the mold halves are brought together by a first means and the clamping pressure is brought about by a second, separate means.

4 Claims, 3 Drawing Figures

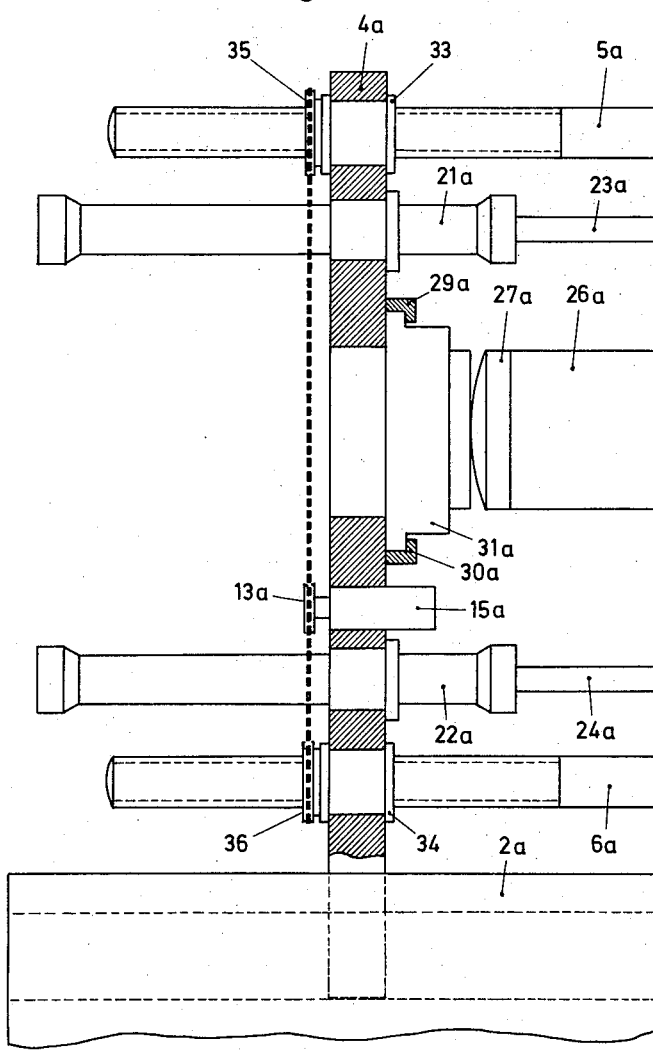

INJECTION MOLDING MACHINE

BACKGROUND OF THE INVENTION

It is common practice to construct an injection molding machine in such a way that the mold halves are transversed together and then clamped tightly to resist the separating forces that take place when the liquid plastic is injected under pressure. For instance, the German Pat. No. 1,006,590 shows a mold-closure device for injection molding machines for the forming of metal- or thermo-plastic masses in which a stationary mold carrier carried on four guide columns is connected with a thrust plate arranged at a certain distance from the stationary mold carrier. On the guide columns is carried a displaceable mold carrier, which carrier may be moved into closed and open positions with little expenditure of force by a working member consisting of a piston-cylinder unit. The thrust plate has an opening through which extends a spacer, which is fixed to the movable mold carrier at the open position of the movable mold carrier. In the closed position of this mold carrier, a pressure member (designed also as a piston-cylinder unit) can be brought in front of the opening of the thrust plate which will fill out nearly completely the space between the thrust plate and a spacer which is fastened to the movable mold carrier. From this pressure member, the forces are exerted which are necessary for holding together both mold carriers. Before the backward movement of the movable mold carrier into the open position is executed, the pressure member is relieved first and is moved over guides into its out-of-operation position. Thereafter, the displaceable mold carrier is brought into the open position from the working member and the spacer extends again through the opening in the thrust plate.

A similar construction is shown in German Pat. No. 1,127,069 in which is shown an injection molding machine especially made for working with thermo-plastic products. The mold-closure device has the same general design as the mold-closure device shown in the German Pat. No. 1,006,590. The injection molding machine shown in the German Pat. No. 1,127,069 has its pressure member fixedly mounted on the thrust plate. However, the spacer, which transmits the holding forces from the pressure member to the movable mold carrier, can swing out of the area of this mold carrier before the opening operation of the movable mold carrier begins. In these known arrangements, the size of the stroke movement of the working member and pressure member is predetermined. Consequently, only mold halves with exact, predetermined height can be used. If, however, these mold halves have a greater height than the length of the spacer which is arranged between the movable mold carrier and the pressure member, the spacer has to be reduced or made fit to the new height of the mold halves. This is complicated and time-consuming. In addition, with increased mold-half height, the size of the opening stroke will be reduced in these known arrangements and this can make it difficult or impossible to remove the molded object from the mold. These and other difficulties experienced with the prior art devices have been obviated in a novel manner by the present invention.

It is, therefore, an outstanding object of this invention to improve the above-mentioned machines and create an injection molding machine for thermo-plastic masses in such a way that the opening stroke of the displaceable mold carrier is always kept constant, irrespective of the height of the mold and that a change of the length of the spacer is not required.

SUMMARY OF THE INVENTION

In general, this can be achieved by making the support for the pressure member displaceable back-and-forth relative to the fixed mold carrier. This displacement of the supports of the working member and the pressure member is always made after a mold exchange, when the new mold incorporates another thickness than the thickness of the previous mold. This displacement can be brought about in such a way that the fixed thrust plate, which is supported on the stand of the machine, is equipped with an adjusting plate for the support of the working member and the pressure member. Another characteristic of this invention is that a nut is turnably supported within the thrust plate and has a threaded shaft which is connected to the adjusting plate. By turning the nut, the shaft and the adjusting plate are displaced in the direction of the fixed mold carrier. In the case where the working and pressure member are attached directly to the thrust plate, the displacement can be made in such a way that the thrust-plate is displaceably guided on the machine stand. The columns are equipped with a thread in the area of the thrust-plate and carrying inside the thrust-plate guide nuts which are rotated from a common drive for the displacement of the thrust plate.

BRIEF DESCRIPTION OF THE DRAWINGS

The character of the invention, however, may be best understood by reference to one of its structural forms, as illustrated by the accompanying drawings, in which:

FIG. 3 is a front elevational view of a modified form of the thrust plate.

DESCRIPTION OF THE PREFERRED EMBODIMENT

Figure 1:
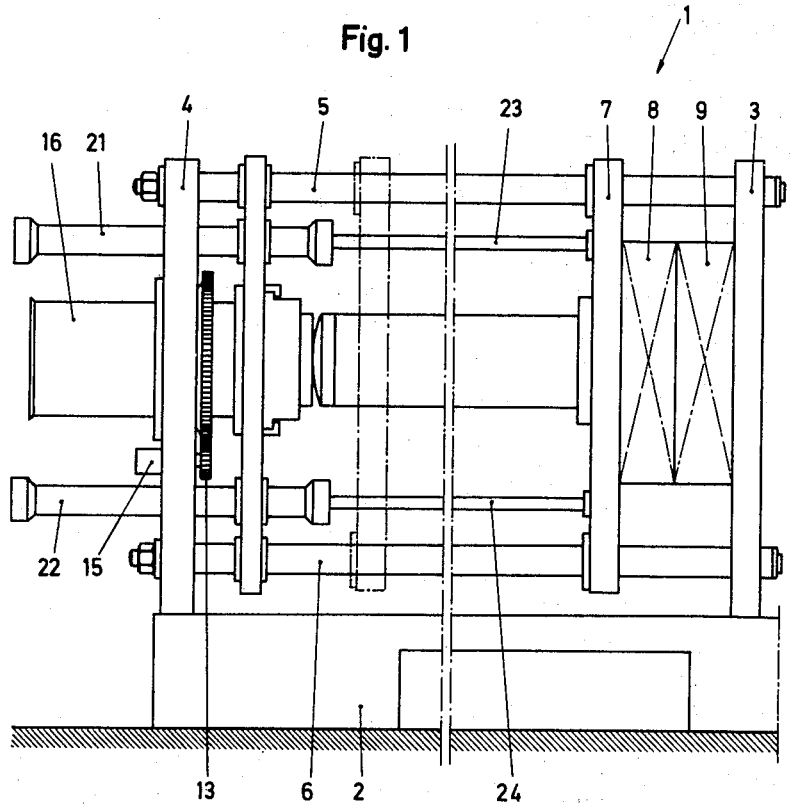
FIG. 1 is a front elevation of an injection molding machine with a mold-closure device constructed in accordance with the present invention.

Referring first to FIG. 1, it can be seen that the injection molding machine 1 consists of a frame-type stand 2 on which is mounted a stationary mold carrier 3. At a certain distance from this mold carrier 3 is arranged on the stand 2 a thrust plate 4, which in this design example is fixedly connected to the stand 2. A thrust plate 4 is connected with the stationary mold carrier by four guide columns, of which only two guide columns 5, 6 are visible in this view. On these columns 5, 6 is displaceably supported in the known manner, a movable mold carrier 7. On the opposed surfaces of the mold carrier 3,7 each is mounted a mold half 8,9.

Figure 2:
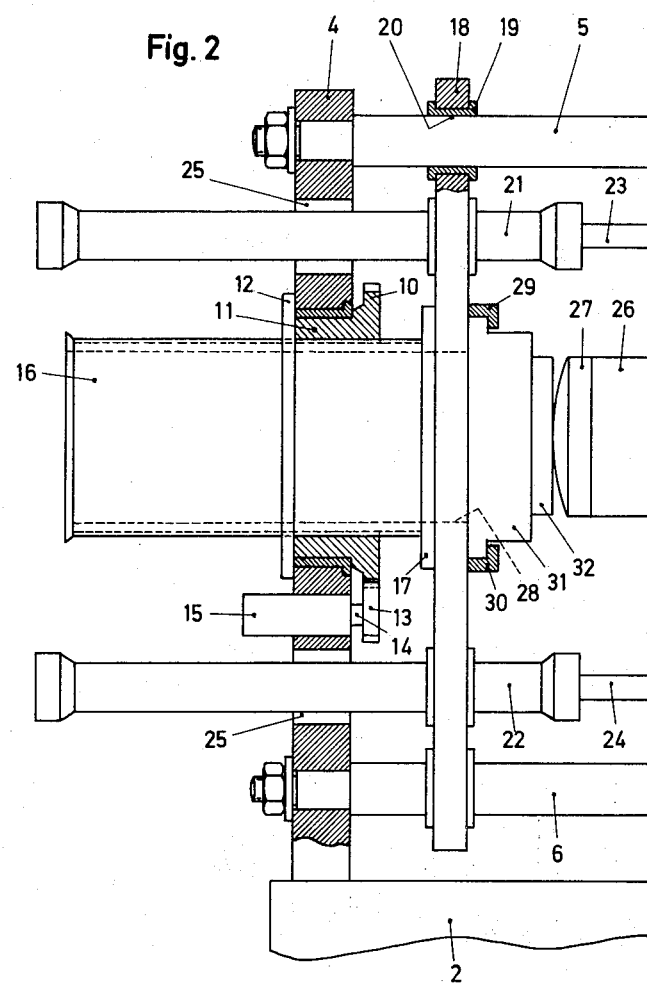
FIG. 2 shows an enlarged, partially-sectional view in the area of the thrust plate of the injection molding machine.

Referring now to FIG. 2, inside the thrust plate 4 is inserted a nut 11 which is equipped with a collar 10 and which is kept in this position by a restraining ring 12. The outside cylindrical surface of the collar 10 is equipped with a gear which engages a pinion 13. This pinion 13 can be turned by hand or, as shown in the drawing, can be mounted on a shaft 14 of a hydraulic motor 15. The nut 11 supports a threaded shaft 16, which is provided with a hollow interior. The end directed toward the movable mold carrier 7 is fixedly connected to a flange 17 which an adjusting plate 18 to the thrust plates 4. The adjusting plate 18 has sleeves 19 equipped with bores 20 by which the adjusting plate 18 is guided on the columns 5,6. By turning the nut 11 by means of the hydraulic motor 15, the spindle 16 (which is fixed against turning) is axially displaced, so that the adjusting plate 18 is moved back-and-forth in the direction of the movable mold carrier 7. The adjusting plate 18 is equipped with two piston-cylinder units 21, 22 which are arranged parallel to the columns 5, 6, the piston rods 23, 24 of which are connected with the movable mold carrier 7. The piston-cylinder units 21, 22 can be driven pneumatically and serve to move the movable mold carrier 7 with its mold half 8 out of the position shown in full lines in FIG. 1 (which is the closed position) back into the position shown by the broken lines (which is the open position). The piston-cylinder units 21, 22 are fastened to the adjusting plate 18, in such a way that they extend through the openings 25 in the thrust plate 4. The diameter of the piston-cylinder unit 21, 22 is dimensioned in such a way that the pistons are able to supply the small forces for the movement of the mold carrier 7, but not the necessary greater forces for clamping the mold in its closed position.

The movable mold carrier 7 is equipped with a pipe-shaped spacer 26 which is flanged at the end facing the adjusting plate 18 and carries on its free end a contact element 27. In the open position of the mold carrier 7, the spacer 26 extends through the adjusting plate 18, which is provided with a corresponding opening 28, and into the hollow shaft 16. The length of this spacer 26, including the element 27, is selected in such a way that in the closed position of the mold carrier 7 a certain distance is available between the element 27 and the opposing area of the adjusting plate 18. On the adjusting plate 18 are mounted guide bars 29, 30 (running perpendicular to the plane of the drawing) and these serve to mount one piston-cylinder unit 31 having a relatively large diameter and short stroke. In the closed position of mold carrier 7 the piston-cylinder unit 31 (which normally is out of the line of action) is moved by a special drive, not shown in here, in front of the opening 28 of the adjusting plate 18. The height of this piston-cylinder unit 31 with its retracted piston 32 is approximately 2mm smaller than the free distance between the element 27 and the adjusting plate 18. By means of this piston-cylinder unit 31 in the closed position of the mold carrier 7 the necessary clamping forces may be applied for keeping the mold halves closed during the injection molding operation. If an exchange of mold halves 8,9 takes place with larger or smaller thicknesses to be used, the adjusting plate 18 and with it the piston-cylinder units 21, 22 and piston-cylinder unit 31 will be displaced by the shaft 16 in an amount corresponding to the change of the mold thickness, so that the opening stroke is maintained constant.

In FIG. 3 the same parts are designated by the same reference numbers as in FIGS. 1 and 2, but with the addition of the letter a. The piston-cylinder units 21a, 22a are directly fastened to the thrust plate 4a. Also, the guide bars 29a, 30a in which are displaceably supported the piston-cylinder units 31a, are carried directly on the thrust plate 4a. The thrust plate 4a, however, is not fixedly mounted to the stand 2a, but is displaceably mounted in guides. The guide columns 5a, 6a are formed with threads on the ends facing the thrust plate 4a and carry adjusting nuts 33, 34 which are rotatably supported in the thrust plate 4a. Each adjusting nut 33, 34 carrys a pinion 35, 36 on the end which extends out of the thrust plate 4a. These pinions 35, 36 are connected together by a chain and to a pinion 13a fastened to the hydraulic motor 15a. By operating the hydraulic motor 15a, all adjusting nuts 33, 34 are turned in the same direction and in the same amount, thus resulting in the displacement of the thrust plate 4a to or from the mold carrier 7.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An injection molding machine for working with thermoplastic masses, comprising
    a. a stand,
    b. a stationary mold carrier stationarily mounted on the stand,
    c. a thrust plate mounted on the stand,
    d. a plurality of columns extending between the thrust plate and the stationary mold carrier,
    e. a displaceable mold carrier slidably mounted on the columns,
    f. a support movable with respect to the stationary mold carrier and having an aperture,
    g. a working member for moving the displaceable mold carrier with respect to the stationary mold carrier,
    h. an elongated spacer extending from the displaceable mold carrier toward the support and movable through the aperture in the support as the displaceable mold carrier approaches the support,
    i. a pressure member mounted on the support and movable across the aperture of the support to control passage of the spacer through the aperture, the pressure member being adapted to exert pressure on the spacer, and
    j. an adjusting element adapted to set the distance between the support and the displaceable mold carrier.

2. An injection molding machine as recited in claim 1, wherein the adjusting means includes a cylindrical spindle having an axial bore through which the spacer may pass.

3. An injection molding machine as recited in claim 1, wherein the thrust plate is stationary with respect to the stationary mold carrier and the adjusting means includes a threaded nut and threaded spindle, the nut being mounted in the thrust plate and the spindle being connected to the support.

4. An injection molding machine as recited in claim 1, wherein the thrust plate and the support are the same element and the adjusting means includes a threaded portion on the columns and a threaded nut on the thrust plate.

* * * * *